United States Patent
Hoshino et al.

(10) Patent No.: US 10,150,486 B2
(45) Date of Patent: Dec. 11, 2018

(54) DRIVING ASSISTANCE DEVICE AND DRIVING ASSISTANCE SYSTEM

(71) Applicants: AISIN SEIKI KABUSHIKI KAISHA, Kariya-shi, Aichi (JP); TOYOTA JIDOSHA KABUSHIKI KAISHA, Toyota-shi, Aichi (JP); DENSO CORPORATION, Kariya-shi, Aichi (JP)

(72) Inventors: Tsuyoshi Hoshino, Kariya (JP); Hidehiko Miyoshi, Tajimi (JP); Norio Imai, Anjo (JP); Takatomo Asai, Nagoya (JP); Motonari Obayashi, Nagakute (JP); Hironobu Ishijima, Toyota (JP); Kiyoshi Takahashi, Hekinan (JP)

(73) Assignees: AISIN SEIKI KABUSHIKI KAISHA, Kariya-shi, Aichi (JP); TOYOTA JIDOSHA KABUSHIKI KAISHA, Toyota-shi, Aichi (JP); DENSO CORPORATION, Kariya-shi, Aichi (JP)

( * ) Notice: Subject to any disclaimer, the term of this patent is extended or adjusted under 35 U.S.C. 154(b) by 0 days.

(21) Appl. No.: 15/509,773

(22) PCT Filed: Sep. 10, 2015

(86) PCT No.: PCT/JP2015/075762
§ 371 (c)(1),
(2) Date: Mar. 8, 2017

(87) PCT Pub. No.: WO2016/039428
PCT Pub. Date: Mar. 17, 2016

(65) Prior Publication Data
US 2017/0259831 A1   Sep. 14, 2017

(30) Foreign Application Priority Data

Sep. 12, 2014   (JP) ................................ 2014-186799

(51) Int. Cl.
*B60W 50/14*   (2012.01)
*B60K 35/00*   (2006.01)
(Continued)

(52) U.S. Cl.
CPC ............. *B60W 50/14* (2013.01); *B60K 35/00* (2013.01); *B60K 37/02* (2013.01); *B60R 1/00* (2013.01);
(Continued)

(58) Field of Classification Search
CPC ...................... B60K 2350/1028; B60K 35/00
(Continued)

(56) References Cited

U.S. PATENT DOCUMENTS

2004/0119610 A1* 6/2004 Maemura ............... B60Q 9/005
340/932.2
2012/0194355 A1* 8/2012 Thomas .................... B60R 1/00
340/932.2
(Continued)

FOREIGN PATENT DOCUMENTS

JP   2008-159604 A   7/2008
JP   2012-001041 A   1/2012
(Continued)

OTHER PUBLICATIONS

Notification of Reasons for Refusal for JP Application No. 2014-186799 dated Jun. 30, 2016.
(Continued)

*Primary Examiner* — Fabricio R Murillo Garcia
(74) *Attorney, Agent, or Firm* — Sughrue Mion, PLLC

(57) ABSTRACT

A driving assistance device according to an embodiment includes: a target setting unit configured to set a stop target;
(Continued)

an acquisition unit configured to acquire a position of a vehicle; and an output information control unit configured to control a display unit to display a first image that instructs a driver to stop the vehicle in a first form when the vehicle is located within a region including the stop target and display the first image in a second form different from the first form when the vehicle is located outside the region.

7 Claims, 12 Drawing Sheets

(51) Int. Cl.
*B60R 1/00* (2006.01)
*B60R 21/00* (2006.01)
*B60W 30/06* (2006.01)
*B60K 37/02* (2006.01)
*G08G 1/16* (2006.01)

(52) U.S. Cl.
CPC ............ *B60R 21/00* (2013.01); *B60W 30/06* (2013.01); *G08G 1/168* (2013.01); *B60K 2350/106* (2013.01); *B60K 2350/1028* (2013.01); *B60K 2350/1084* (2013.01); *B60K 2350/1088* (2013.01); *B60K 2350/2013* (2013.01); *B60K 2350/2034* (2013.01); *B60K 2350/352* (2013.01); *B60K 2350/965* (2013.01); *B60R 2300/70* (2013.01); *B60R 2300/806* (2013.01); *B60W 2050/143* (2013.01); *B60W 2050/146* (2013.01)

(58) Field of Classification Search
USPC ....................................................... 340/932.2
See application file for complete search history.

(56) References Cited

U.S. PATENT DOCUMENTS

| | | | |
|---|---|---|---|
| 2013/0120578 A1* | 5/2013 | Iga ............................ | B60R 1/00 348/148 |
| 2013/0173148 A1* | 7/2013 | Kagawa ............. | B62D 15/0275 701/400 |
| 2015/0258989 A1* | 9/2015 | Okano ..................... | H04N 7/18 701/1 |
| 2015/0375742 A1* | 12/2015 | Gebert ................. | B62D 15/027 701/23 |

FOREIGN PATENT DOCUMENTS

| JP | 2012-076483 A | 4/2012 |
|---|---|---|
| JP | 2015-121960 A | 7/2015 |

OTHER PUBLICATIONS

Decision to Grant for JP Application No. 2014-186799 dated Jan. 25, 2017.
International Search Report for PCT/JP2015/075762 dated Nov. 24, 2015.

* cited by examiner

DRIVING ASSISTANCE DEVICE AND DRIVING ASSISTANCE SYSTEM

This application is national stage application of International Application No. PCT/JP2015/075762, filed Sep. 10, 2015, which designates the United States, incorporated herein by reference, and which is based upon and claims the benefit of priority from Japanese Patent Application No. 2014-186799, filed Sep. 12, 2014, the entire contents of which are incorporated herein by reference.

TECHNICAL FIELD

Embodiments of the present invention relate to a driving assistance device and a driving assistance system.

BACKGROUND ART

Some vehicles are mounted with an assistance device configured to assist parking and other driving situations. For example, the assistance device guides the vehicle to a target position. When the vehicle arrives at the target position, the assistance device instructs a driver to stop the vehicle by voice, for example.

Patent Document 1: Japanese Patent Application Publication No. 2012-76483

DISCLOSURE OF INVENTION

Problem to be Solved by the Invention

The driver recognizes an instruction from the assistance device, and follows the instruction to perform various kinds of operations, such as stopping the vehicle and changing gears. If an instruction is made by the assistance device suddenly, it may take time for the driver to perform the instructed operation.

Means for Solving Problem

A driving assistance device according to an embodiment, includes: a target setting unit configured to set a stop target; an acquisition unit configured to acquire a position of a vehicle; and an output information control unit configured to control a display unit to display a first image that instructs a driver to stop the vehicle in a first form when the vehicle is located within a region including the stop target and display the first image in a second form different from the first form when the vehicle is located outside the region. This configuration enables, for example, a driver to know in advance that the vehicle needs to be stopped.

In the driving assistance device according to an embodiment, the output information control unit controls the display unit to display a second image that changes in accordance with the position of the vehicle. This configuration enables, for example, the driver to recognize a distance to the stop target by the second image.

In the driving assistance device according to an embodiment, the second image indicates a direction corresponding to a travel direction of the vehicle, and the output information control unit controls the display unit to dispose the first image in the direction indicated by the second image with respect to the second image. This configuration enables, for example, the driver to more intuitively recognize the distance to the stop target by the second image.

In the driving assistance device according to an embodiment, the stop target includes a first target and a second target that is provided in a middle of a path for guiding the vehicle to the first target, the first image includes a first mark and a second mark different from the first mark, and the output information control unit controls the display unit to display the first mark when the vehicle travels toward the first target and display the second mark when the vehicle travels toward the second target. This configuration enables, for example, the driver to know in advance that the vehicle needs to be moved to the first target after the vehicle is stopped at the second target.

Furthermore, the output information control unit controls the display unit to display the second image in the second form when the vehicle is located within the region and display the second image in the first form when the vehicle is located outside the region. This configuration enables, for example, the driver to more clearly recognize that the vehicle is located within the region including the stop target.

Furthermore, the output information control unit controls the display unit to display the first image or the second image brightly in the first form and display the first image or the second image darkly in the second form. This configuration enables, for example, the driver to more clearly recognize that the vehicle is located within the region including the stop target.

A driving assistance system according to an embodiment includes: a target setting unit configured to set a stop target; an acquisition unit configured to acquire a position of a vehicle; and a display unit configured to display a first image that instructs a driver to stop the vehicle in a first form when the vehicle is located within a region including the stop target and display the first image in a second form different from the first form when the vehicle is located outside the region. This configuration enables, for example, the driver to know in advance that the vehicle needs to be stopped.

BEST MODES FOR CARRYING OUT THE INVENTION

Exemplary embodiments of the present invention are disclosed below. Configurations in the following embodiments and actions, results, and effects obtained by the configurations are illustrative. The present invention can also be implemented by other configurations than those disclosed in the following embodiments, and can provide at least one of various kinds of effects based on fundamental configurations and their secondary effects.

A vehicle 1 according to the present embodiment may be, for example, an automobile that uses an internal combustion engine (not illustrated) as a drive source, that is, an internal combustion engine automobile, an automobile that uses a motor (not illustrated) as a drive source, that is, an electric automobile or a fuel cell automobile, a hybrid automobile that uses both an internal combustion engine and a motor as drive sources, or an automobile including another drive source. The vehicle 1 can mount various kinds of transmission devices thereon, and can mount thereon various kinds of devices such as systems and components necessary for driving an internal combustion engine and a motor. The systems, number, and layout of devices related to driving of wheels 3 in the vehicle 1 can be variously set.

Figure 1:
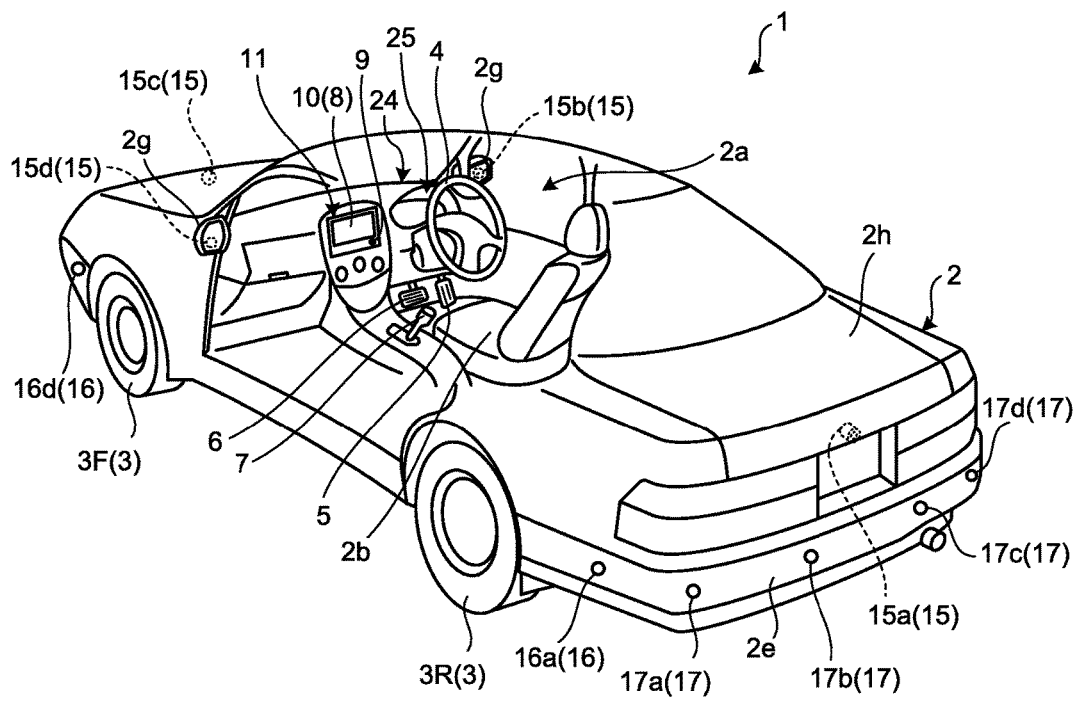
FIG. 1 is an exemplary perspective view illustrating a vehicle with a vehicle interior partially seen through, according to an embodiment.

As exemplified in FIG. 1, a vehicle body 2 constitutes a vehicle interior 2a where occupants (not illustrated) ride. In the vehicle interior 2a, a steering unit 4, an acceleration operation unit 5, a braking operation unit 6, a gear shift operation unit 7, and other such units are provided so as to face a seat 2b for a driver as an occupant. The steering unit 4 is, for example, a steering wheel that protrudes from a dashboard 24. The acceleration operation unit 5 is, for example, an accelerator pedal located at the feet of the driver. The braking operation unit 6 is, for example, a brake pedal located at the feet of the driver. The gear shift operation unit 7 is, for example, a shift lever that protrudes from a center console. The steering unit 4, the acceleration operation unit 5, the braking operation unit 6, the gear shift operation unit 7, and other such units are not limited to the above.

In the vehicle interior 2a, a display device 8 as a display output unit and a voice output device 9 as a voice output unit are provided. The display device 8 is, for example, a liquid crystal display (LCD) or an organic electroluminescent display (OELD). The voice output device 9 is, for example, a speaker. The display device 8 is covered with a transparent operation input unit 10, such as a touch panel. Occupants can view images displayed on a display screen of the display device 8 through the operation input unit 10. The occupants can execute operation inputs by operating the operation input unit 10 by touching, pushing, and moving with their fingers at positions corresponding to the images displayed on the display screen of the display device 8. The display device 8, the voice output device 9, the operation input unit 10, and other such units are provided to, for example, a monitor device 11 located at a central portion of the dashboard 24 in the vehicle width direction, that is, in the horizontal direction. The monitor device 11 may include an operation input unit (not illustrated), such as a switch, a dial, a joystick, and a push button. Another voice output device (not illustrated) may be provided at a position in the vehicle interior 2a different from the position of the monitor device 11. Voice may be output from the other voice output device and the voice output device 9 included in the monitor device 11. The monitor device 11 may be used also as a navigation system or an audio system.

Figure 3:
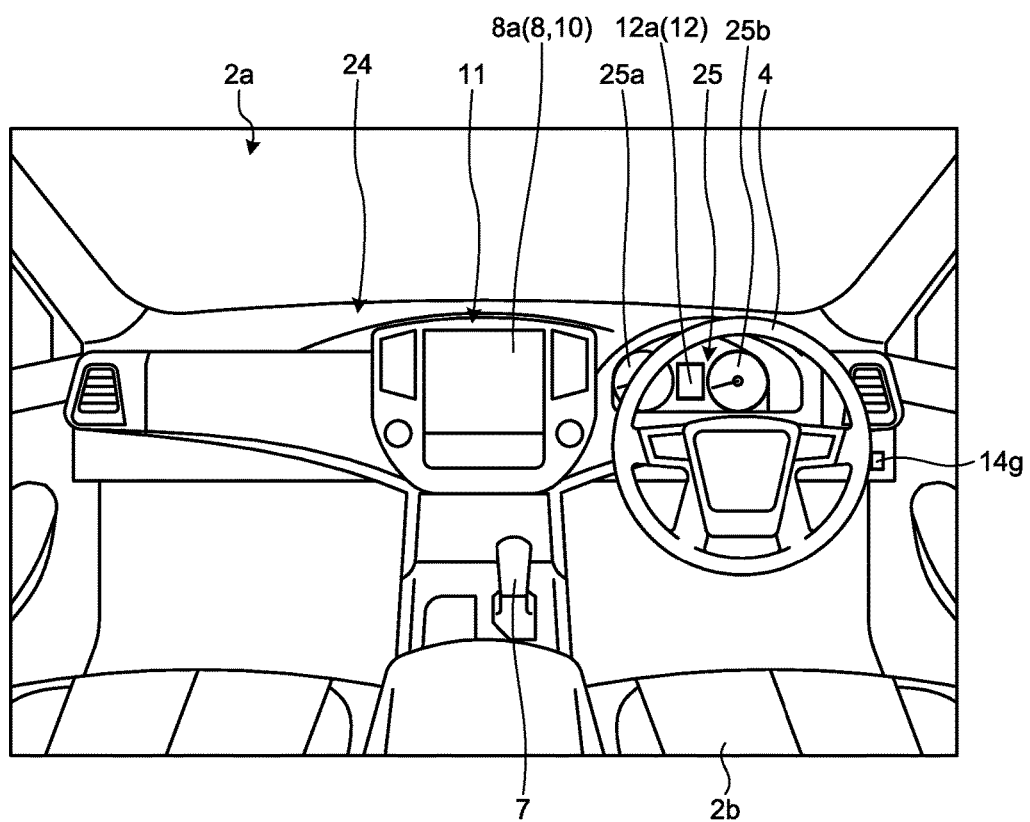
FIG. 3 is a view of an example of a dashboard of the vehicle as viewed from behind the vehicle, according to the embodiment.

In the vehicle interior 2a, a display device 12 different from the display device 8 is provided. As exemplified in FIG. 3, for example, the display device 12 is provided to an instrument panel unit 25 in the dashboard 24, and is located between a speed display unit 25a and an rpm display unit 25b at substantially the center of the instrument panel unit 25. The size of a screen 12a of the display device 12 is smaller than the size of a screen 8a of the display device 8. Images representing information on parking assistance for the vehicle 1 may be mainly displayed on the display device 12. The amount of information displayed on the display device 12 may be smaller than the amount of information displayed on the display device 8. The display device 12 is, for example, an LCD or an OELD. Information displayed on the display device 12 may be displayed on the display device 8 also.

Figure 2:
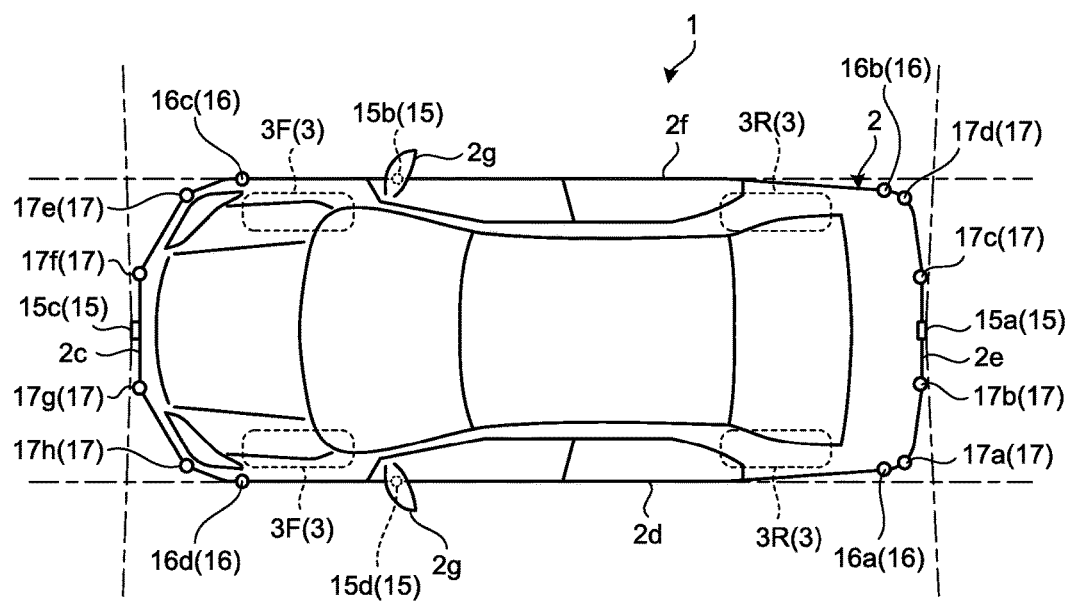
FIG. 2 is an exemplary plan view (overhead view) of the vehicle according to the embodiment.

As exemplified in FIGS. 1 and 2, the vehicle 1 is, for example, a four-wheel automobile, and has two right and left front wheels 3F and two right and left rear wheels 3R. The four wheels 3 are each turnable. As exemplified in FIG. 4, the vehicle 1 includes a steering system 13 configured to steer at least two wheels 3. The steering system 13 includes an actuator 13a and a torque sensor 13b. The steering system 13 is electrically controlled by an electronic control unit (ECU) 14 and the like to operate the actuator 13a. The steering system 13 is, for example, an electric power steering system or a steer-by-wire (SBW) system. The steering system 13 adds torque, that is, assist torque, to the steering unit 4 by the actuator 13a to compensate for steering force, and turns the wheel 3 by the actuator 13a. In this case, the actuator 13a may turn one wheel 3 or may turn a plurality of wheels 3. For example, the torque sensor 13b detects torque applied by the driver to the steering unit 4.

As exemplified in FIG. 2, the vehicle body 2 is provided with, for example, four image pickup units 15a to 15d as a plurality of image pickup units 15. The image pickup unit 15 is, for example, a digital camera having imaging elements incorporated therein, such as charge coupled devices (CCDs) and CMOS image sensors (CISs). The image pickup unit 15 can output moving image data at a predetermined frame rate. Each image pickup unit 15 includes a wide angle lens or a fisheye lens, and can photograph a range of 140° to 190° in the horizontal direction, for example. The optical axis of the image pickup unit 15 is set to be obliquely downward. The image pickup unit 15 thus sequentially photographs the road surface where the vehicle 1 is movable and external environments around the vehicle body 2 including a region where the vehicle 1 can be parked, and outputs the photographed images as photographed image data.

For example, the image pickup unit 15a is located at a rear end portion 2e of the vehicle body 2 and provided at a wall portion below a door 2h of a rear trunk. For example, the image pickup unit 15b is located at a right end portion 2f of the vehicle body 2 and provided to a right door mirror 2g.

For example, the image pickup unit 15c is located on the front side of the vehicle body 2, that is, at a front end portion 2c in the vehicle longitudinal direction and provided to a front bumper or the like. For example, the image pickup unit 15d is located on the left side of the vehicle body 2, that is, at a left end portion 2d in the vehicle width direction and provided to a door mirror 2g as a left-side protrusion. The ECU 14 can execute calculation processing and image processing on the basis of image data obtained by the image pickup units 15, thereby generating images with a wider angle of view and virtual overhead images as seen from above the vehicle 1. The overhead image can be referred to also as "plan image".

On the basis of images from the image pickup units 15, the ECU 14 identifies partition lines and the like indicated on the road surface around the vehicle 1 to detect (extract) a parking section indicated by the partition lines and the like.

As exemplified in FIGS. 1 and 2, the vehicle body 2 is provided with, for example, four distance measurement units 16a to 16d and eight distance measurement units 17a to 17h as a plurality of distance measurement units 16 and 17. The distance measurement units 16 and 17 are, for example, sonars configured to emit ultrasound and capture its reflected waves. The sonar can be referred to also as "sonar sensor" or "ultrasound detector". The ECU 14 can detect the presence/absence of an object such as an obstacle located around the vehicle 1 and measure the distance to the object on the basis of detection results of the distance measurement units 16 and 17. Specifically, the distance measurement units 16 and 17 are an example of a detection unit configured to detect an object. For example, the distance measurement units 17 may be used to detect an object at a relatively short distance, and for example, the distance measurement units 16 may be used to detect an object at a relatively long distance farther than that for the distance measurement units 17. For example, the distance measurement units 17 may be used to detect objects ahead and behind the vehicle 1, and the distance measurement units 16 may be used to detect objects on the sides of the vehicle 1.

Figure 4:
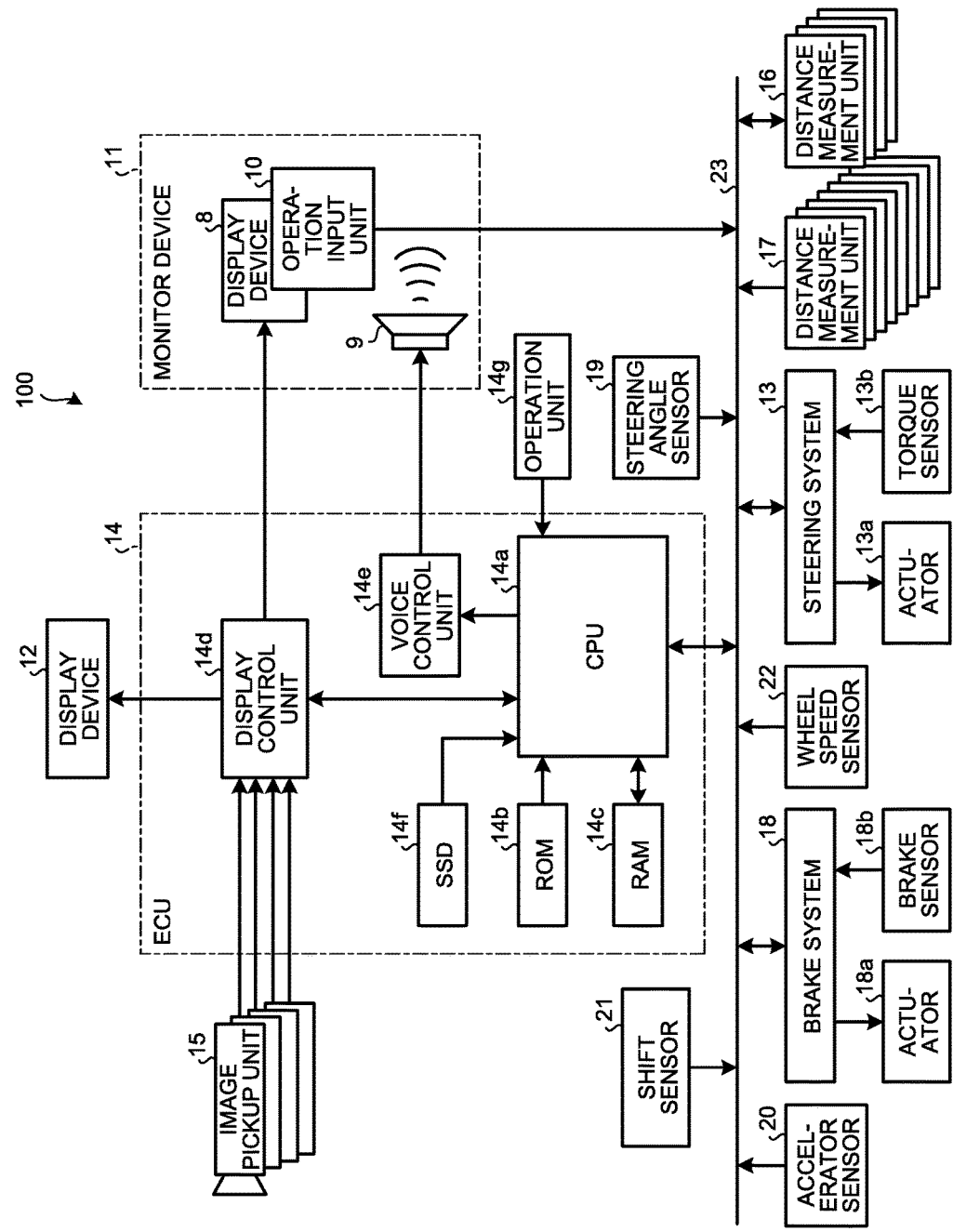
FIG. 4 is an exemplary block diagram of a configuration of a parking assistance system according to the embodiment.

As exemplified in FIG. 4, in a parking assistance system 100, the ECU 14, the monitor device 11, the steering system 13, and the distance measurement units 16 and 17 as well as a brake system 18, a steering angle sensor 19, an accelerator sensor 20, a shift sensor 21, a wheel speed sensor 22, and the like are electrically connected to one another via an in-vehicle network 23 as an electric communication line. The in-vehicle network 23 is configured as, for example, a controller area network (CAN). The ECU 14 can control the steering system 13, the brake system 18, and other such systems by transmitting control signals via the in-vehicle network 23. The ECU 14 can receive, via the in-vehicle network 23, detection results of the torque sensor 13b, a brake sensor 18b, the steering angle sensor 19, the distance measurement units 16, the distance measurement units 17, the accelerator sensor 20, the shift sensor 21, the wheel speed sensor 22, and other such systems and operation signals of the operation input unit 10 and other such units.

The ECU 14 includes, for example, a central processing unit (CPU) 14a, a read only memory (ROM) 14b, a random access memory (RAM) 14c, a display control unit 14d, a voice control unit 14e, and a solid state drive (SSD, flash memory) 14f. For example, the CPU 14a can execute image processing on images to be displayed on the display devices 8 and 12 and various kinds of calculation processing and control, such as determining a movement target position of the vehicle 1, calculating a movement path of the vehicle 1, determining the presence/absence of an interference with an object, performing automatic control of the vehicle 1, and releasing the automatic control. The CPU 14a can read a computer program installed and stored in a non-volatile storage device such as the ROM 14b, and execute calculation processing in accordance with the computer program. The RAM 14c temporarily stores therein various kinds of data used for the calculation by the CPU 14a. The display control unit 14d mainly executes image processing that uses image data obtained from the image pickup units 15, the processing of combining image data to be displayed on the display device 8, and other processing among the calculation processing in the ECU 14. The voice control unit 14e mainly processes voice data output from the voice output device 9 among the calculation processing in the ECU 14. The SSD 14f is a rewritable non-volatile storage unit, and can store data therein even when the ECU 14 is powered off. The CPU 14a, the ROM 14b, the RAM 14c, and the like may be integrated in the same package. The ECU 14 may be configured to use another logic calculation processor or logic circuit such as a digital signal processor (DSP) in place of the CPU 14a. A hard disk drive (HDD) may be provided in place of the SSD 14f. The SSD 14f and the HDD may be provided separately from the ECU 14.

The brake system 18 is, for example, an anti-lock brake system (ABS) configured to prevent the locking of the brake, an electronic stability control (ESC) configured to prevent the skidding of the vehicle 1 during cornering, and an electric brake system configured to enhance brake force (execute brake assist), and a brake-by-wire (BBW). The brake system 18 applies braking force to the wheels 3 and thus the vehicle 1 via an actuator 18a. The brake system 18 can detect the locking of the brake, the spinning of the wheel 3, and the sign of the skidding on the basis of the rotation difference between the right and left wheels 3, and execute various kinds of control. The brake sensor 18b is, for example, a sensor configured to detect the position of a movable portion in the braking operation unit 6. The brake sensor 18b can detect the position of a brake pedal that is the movable portion. The brake sensor 18b includes a displacement sensor.

The steering angle sensor 19 is, for example, a sensor configured to detect the steering amount of the steering unit 4 such as a steering wheel. For example, the steering angle sensor 19 is configured by a Hall element. The ECU 14 acquires the steering amount of the steering unit 4 by the driver, the steering amount of each wheel 3 for automatic steering, or the like from the steering angle sensor 19, and executes various kinds of control. The steering angle sensor 19 detects a rotational angle of a rotating portion included in the steering unit 4. The steering angle sensor 19 is an example of an angle sensor.

The accelerator sensor 20 is, for example, a sensor configured to detect the position of a movable portion in the acceleration operation unit 5. The accelerator sensor 20 can detect the position of an accelerator pedal that is the movable portion. The accelerator sensor 20 includes a displacement sensor.

The shift sensor 21 is, for example, a sensor configured to detect the position of a movable portion in the gear shift operation unit 7. The shift sensor 21 can detect the position of a lever, an arm, a button, or the like that is the movable portion. The shift sensor 21 may include a displacement sensor, or may be configured as a switch.

The wheel speed sensor 22 is a sensor configured to detect the rotation amount of the wheel 3 or revolutions of the wheel 3 per unit time. The wheel speed sensor 22 outputs a wheel speed pulse count representing the detected rpm as a sensor value. For example, the wheel speed sensor 22 may be configured by a Hall element. The ECU 14 calculates the movement amount of the vehicle 1 and the like on the basis of the sensor value acquired from the wheel speed sensor 22, and executes various kinds of control. The wheel speed sensor 22 may be provided in the brake system 18. In this case, the ECU 14 acquires the detection result of the wheel speed sensor 22 via the brake system 18.

The configurations, arrangement, and electrical connection forms of various kinds of sensors and actuators described above are illustrative, and can be variously set (changed).

Figure 5:
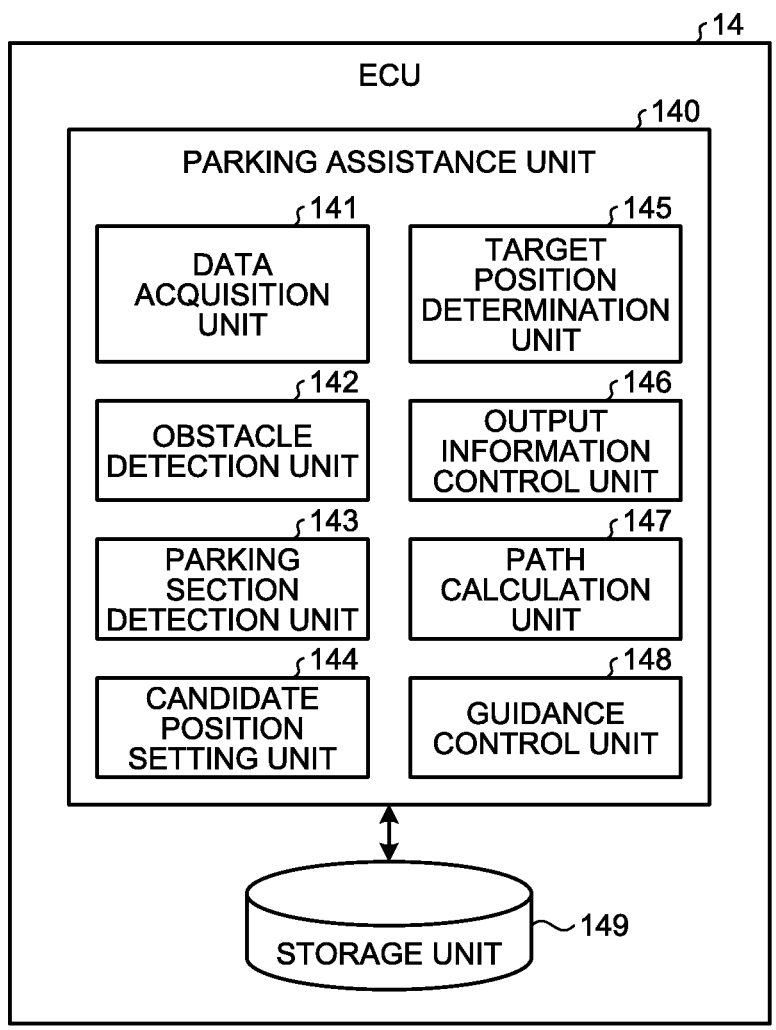
FIG. 5 is an exemplary block diagram of a configuration of an ECU in the parking assistance system according to the embodiment.

Next, the configuration of a parking assistance unit 140 implemented in the ECU 14 is described. As illustrated in FIG. 5, the parking assistance unit 140 includes a data acquisition unit 141, an obstacle detection unit 142, a parking section detection unit 143, a candidate position setting unit 144, a target position determination unit 145, an output information control unit 146, a path calculation unit 147, a guidance control unit 148, and other units. The ECU 14 further includes a storage unit 149.

Each configuration in the parking assistance unit 140 illustrated in FIG. 5 is implemented when the CPU 14a configured as the ECU 14 in FIG. 4 executes a parking assistance program stored in the ROM 14b, for example. Specifically, the parking assistance unit 140 implements the data acquisition unit 141, the obstacle detection unit 142, the parking section detection unit 143, the candidate position setting unit 144, the target position determination unit 145, the output information control unit 146, the path calculation unit 147, the guidance control unit 148, and other units by execution the parking assistance program stored in the ROM 14b. Each of the units may be implemented by hardware. The storage unit 149 is implemented by, for example, the RAM 14c or the SSD 14f.

The data acquisition unit 141 acquires various kinds of information, such as detection results of the sensors and the distance measurement units 16 and 17, image data obtained by the image pickup units 15, and signals of operation inputs from the operation input unit 10, an operation unit 14g, and other units. The operation unit 14g is, for example, a push button or a switch. The obstacle detection unit 142 detects an obstacle on the basis of the information acquired by the data acquisition unit 141. The parking section detection unit 143 detects a parking section on the basis of the information acquired by the data acquisition unit 141. The candidate position setting unit 144 sets candidate positions for a movement target position of the vehicle 1. The target position determination unit 145 determines the movement target position of the vehicle 1. The output information control unit 146 determines information output from the display devices 12 and 8, the voice output device 9, and other devices and the output form or the like of the information. The path calculation unit 147 calculates a movement path to the movement target position of the vehicle 1. The guidance control unit 148 controls each unit in the vehicle 1 so that the vehicle 1 moves to the movement target position along the movement path. The storage unit 149 stores therein data used for the calculation by the ECU 14 or data calculated by the calculation by the ECU 14.

Figure 6:
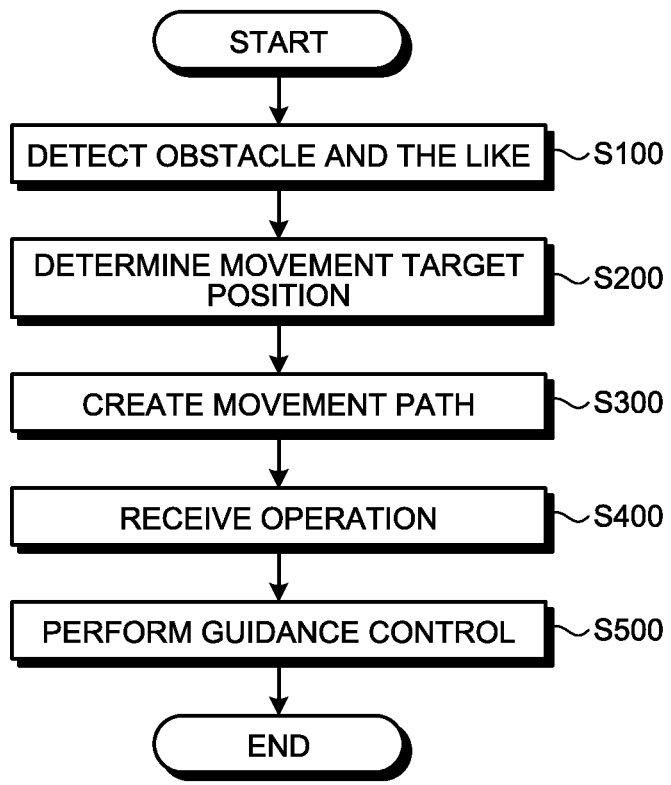
FIG. 6 is an exemplary flowchart of a procedure of parking assistance processing by a parking assistance unit according to the embodiment.

Next, an example of parking assistance processing performed by the parking assistance unit 140 according to the present embodiment is schematically described. The parking assistance processing described below is illustrative, and may be partially omitted or changed. FIG. 6 is a flowchart illustrating an example of a procedure of the parking assistance processing by the parking assistance unit 140.

First, while the vehicle 1 is moving, the parking assistance unit 140 detects vehicles stopped (stopped vehicles), obstacles such as curbs, and partition lines around the vehicle 1 (S100). For example, the obstacle detection unit 142 detects stopped vehicles and obstacles on the basis of the detection results of the distance measurement units 16 and 17 and the image data obtained by the image pickup units 15, which are acquired by the data acquisition unit 141. The parking section detection unit 143 detects a parking section on the basis of the detected stopped vehicles, obstacles, partition lines, and the like. The detection of obstacles and the like may be performed constantly, or may be performed, for example, when the speed of the vehicle 1 falls below a value set in advance. The detection of obstacles and the like may be started after the driver operates the operation unit 14g.

Next, the parking assistance unit 140 determines a movement target position of the vehicle 1 (S200). For example, the candidate position setting unit 144 sets at least one candidate position on the basis of the detected stopped vehicles and the like and the detected parking section. The target position determination unit 145 determines at least one movement target position of the vehicle 1 from the candidate position.

Next, the parking assistance unit 140 creates a movement path of the vehicle 1 (S300). For example, the path calculation unit 147 creates at least one movement path to the determined movement target position. For example, the path calculation unit 147 creates respective movement paths for moving the vehicle 1 to the movement target position by forward parking, perpendicular parking, and parallel parking.

Next, the parking assistance unit 140 receives an operation input about selection and determination of a parking assistance function (S400). For example, when the driver operates the operation unit 14g, the output information control unit 146 that has acquired an input signal of the operation via the data acquisition unit 141 displays a screen for selecting the parking assistance function on the screens 12a and 8a of the display devices 12 and 8. For example, the driver selects any one of the parking assistance functions of forward parking, perpendicular parking, and parallel parking. The parking assistance functions are not limited to forward parking, perpendicular parking, and parallel parking, and include, for example, a function of assisting departure from a parking space to a driving lane. When the driver determines the parking assistance function, the determined parking assistance function is started.

Next, the parking assistance unit 140 performs guidance control of the vehicle 1 on the basis of the selected parking assistance function (S500). For example, the guidance control unit 148 controls the steering system 13 on the basis of the parking assistance function selected by the driver to automatically steer the wheels 3, thereby assisting the parking of the vehicle 1 (automatic steering). The driver operates the acceleration operation unit 5, the braking operation unit 6, and the gear shift operation unit 7, thereby moving the vehicle 1 to the movement target position along the movement path corresponding to the selected parking assistance function. When the distance between the vehicle 1 and the movement target position becomes a predetermined value or less, the guidance control is finished. The guidance control is finished (cancelled) also when a predetermined operation is performed by the steering unit 4, the acceleration operation unit 5, the braking operation unit 6, or the gear shift operation unit 7. During the guidance control, the target position determination unit 145 and the path calculation unit 147 may reset the movement target position of the vehicle 1 and the movement path of the vehicle 1 in accordance with the situation.

The guidance control unit 148 may automatically operate the acceleration operation unit 5, the braking operation unit 6, and the gear shift operation unit 7 in addition to the steering system 13, thereby assisting the parking of the vehicle 1 (automatic controlling). The parking assistance unit 140 may display the movement target position and the movement path on the display device 12 when the vehicle 1 is moved for parking, thereby assisting the parking by the driving by the driver (steering guidance).

In the parking assistance processing described above, for example, the target position determination unit 145 may determine the movement target position without using the candidate position set by the candidate position setting unit 144. The parking assistance unit 140 may determine the movement target position and create the movement path (S200, S300) after receiving an operation input about the selection and determination of the parking assistance function (S400).

Figure 7:
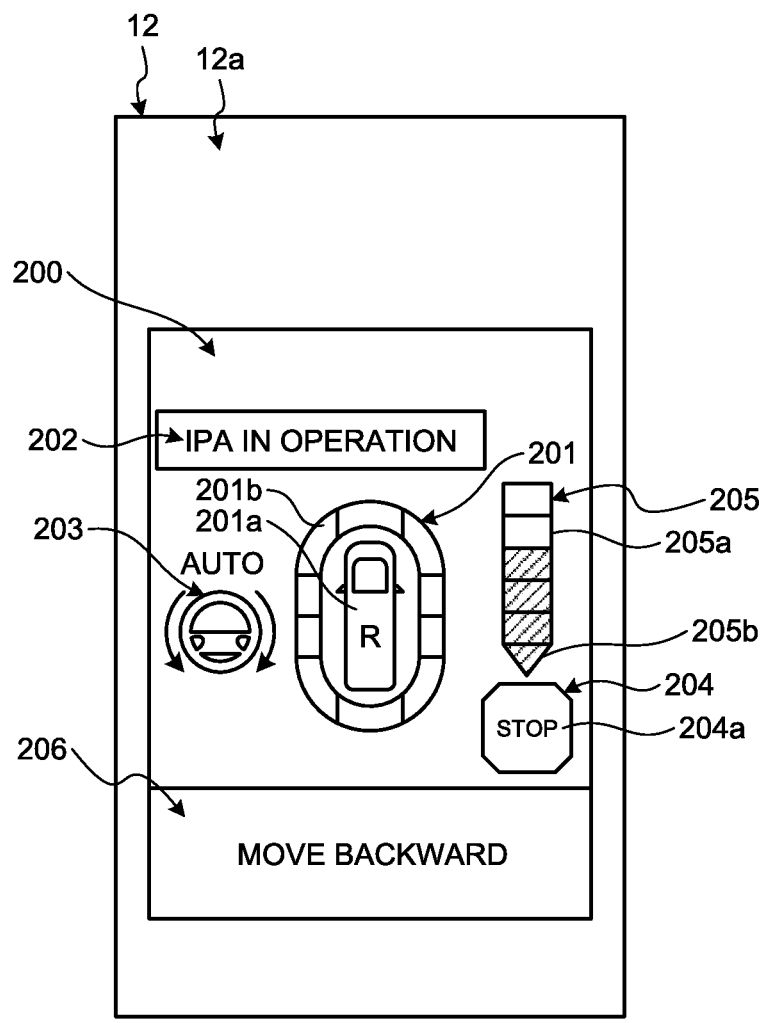
FIG. 7 is an exemplary diagram illustrating an example of a screen of a display device according to the embodiment.

FIG. 7 is a diagram illustrating an example of the screen 12a of the display device 12. While the guidance control unit 148 controls each unit in the vehicle 1, the output information control unit 146 controls the display device 12 by the display control unit 14d in FIG. 3 to display an instruction screen 200 as illustrated in FIG. 7 on the screen 12a. For example, the instruction screen 200 displays the state of the parking assistance system 100 and an instruction to the driver.

The instruction screen 200 includes, for example, a vehicle symbol 201, a first display region 202, a state symbol 203, an instruction mark 204, an indicator 205, and a second display region 206. The instruction mark 204 is an example of a first image. The indicator 205 is an example of a second image.

The vehicle symbol 201 includes a vehicle state display portion 201a and an obstacle display portion 201b. The vehicle state display portion 201a schematically indicates the vehicle 1. The vehicle state display portion 201a may further display the position of the movable portion in the gear shift operation unit 7. For example, when the movable portion in the gear shift operation unit 7 is shifted into the R-range, the vehicle state display portion 201a displays a character "R" as illustrated in FIG. 7. The obstacle display portion 201b is disposed around the vehicle state display portion 201a. When the distance measurement units 16a to 16d and the distance measurement units 17a to 17h detect an obstacle, for example, a part of the obstacle display portion 201b located in the corresponding direction is displayed brightly to notify the driver of the presence of the obstacle in the corresponding direction.

The first display region 202 displays character information representing the state of the parking assistance system 100. For example, when intelligent parking assist (IPA) in the parking assistance system 100 is in operation, the first display region 202 displays character information that "IPA IN OPERATION" as illustrated in FIG. 7. The character information displayed in the first display region 202 is not limited thereto.

The state symbol 203 represents the state of the parking assistance system 100. For example, when the guidance control unit 148 controls the steering system 13 to automatically operate the steering unit 4, the state symbol 203 indicating that the steering unit 4 is automatically operated is displayed on the instruction screen 200. The state symbol 203 is not limited thereto.

The instruction mark 204 is an image that instructs the driver to stop the vehicle. A plurality of kinds of images are prepared as the instruction mark 204. For example, the instruction screen 200 in FIG. 7 displays a temporary stop mark 204a as the instruction mark 204. The temporary stop mark 204a is an example of a second mark.

The output information control unit 146 displays the instruction mark 204 brightly or darkly. The display form in which the instruction mark 204 is displayed brightly is an example of a first form. The display form in which the instruction mark 204 is displayed darkly is an example of a second form.

The output information control unit 146 displays the instruction mark 204 brightly when the vehicle 1 is located within a stop region including a stop target described later. In contrast, the output information control unit 146 displays the instruction mark 204 darkly when the vehicle 1 is located outside the stop region. For example, the chroma of the instruction mark 204 when the vehicle 1 is located within the stop region is higher (brighter) than the chroma of the instruction mark 204 when the vehicle 1 is located outside the stop region. Without being limited to the chroma, the output information control unit 146 may change the luminance or hue of the instruction mark 204.

The first form and the second form are not limited to the above. For example, the output information control unit 146 may display the instruction mark 204 with an enlarged scale when the vehicle 1 is located within the stop region, and display the instruction mark 204 with a reduced scale when the vehicle 1 is located outside the stop region.

The indicator 205 schematically represents the distance between the vehicle 1 and the stop target. For example, the indicator 205 is partitioned into a plurality of sections displayed brightly or darkly. The output information control unit 146 increases or decreases the number of sections displayed brightly and the number of sections displayed darkly in the indicator 205 in accordance with the distance between the vehicle 1 and the stop target. In other words, the indicator 205 changes in accordance with the position of the vehicle 1.

The indicator 205 further indicates the direction corresponding to the travel direction of the vehicle 1. A plurality of kinds of images are prepared as the indicator 205. For example, the instruction screen 200 in FIG. 7 displays a reverse indicator 205a as the indicator 205. The indicator 205 has a distal end portion 205b that indicates the direction, and the distal end portion 205b of the reverse indicator 205a is directed downward in the instruction screen 200. The indicator 205 indicates the direction corresponding to the travel direction of the vehicle 1 also by the direction in which the number of the sections displayed brightly or darkly is increased or decreased.

The instruction mark 204 is located in the direction indicated by the indicator 205 with respect to the indicator 205. For example, on the instruction screen 200 in FIG. 7, the instruction mark 204 is located below the indicator 205.

The second display region 206 displays character information. For example, the character information in the second display region 206 represents an operation that the driver needs to perform. For example, when the driver is required to move the vehicle 1 backward, the second display region 206 displays character information that "MOVE BACKWARD" as illustrated in FIG. 7. The character information displayed in the second display region 206 is not limited thereto.

Figure 8:
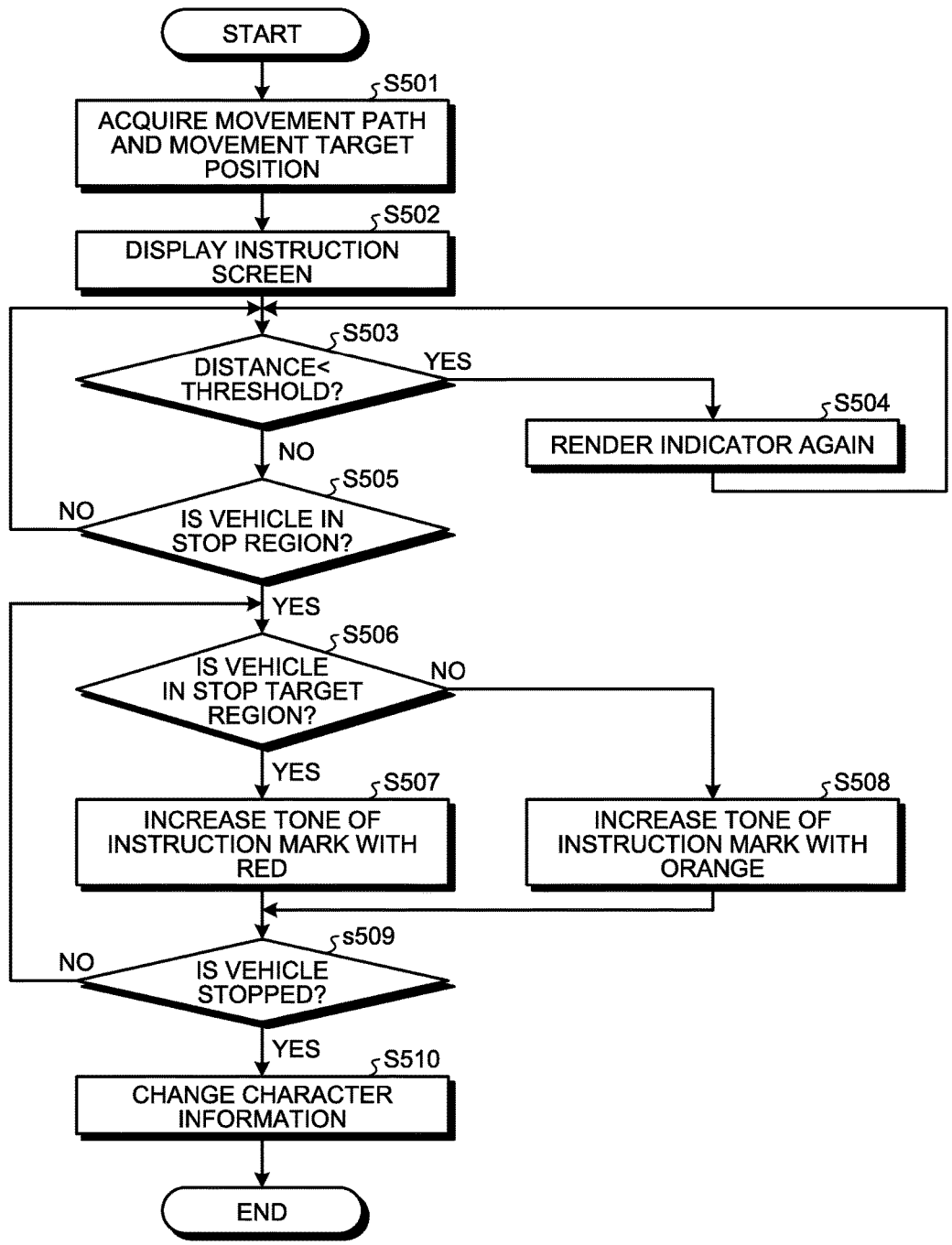
FIG. 8 is an exemplary flowchart illustrating an example of a procedure of instruction screen display processing by an output information control unit according to the embodiment.

Next, an example of instruction screen display processing performed by the output information control unit 146 to display the instruction screen 200 on the screen 12*a* of the display device 12 is described. FIG. 8 is a flowchart illustrating an example of a procedure of the instruction screen display processing performed by the output information control unit 146.

First, the output information control unit 146 acquires a movement target position of the vehicle 1 from the target position determination unit 145, and acquires a movement path to the movement target position of the vehicle 1 from the path calculation unit 147 (S501). The path calculation unit 147 may create a movement path involving turning. The path calculation unit 147 sets, in such a movement path, a plurality of positions (turning positions) at which the vehicle 1 needs to be stopped in addition to the movement target position (parking completed position). Specifically, the turning positions are provided in the middle of a movement path for guiding the vehicle 1 to the parking completed position. In the following description, the parking completed position and the turning position are sometimes referred to as "stop targets".

Next, the output information control unit 146 generates an instruction screen 200, and displays the instruction screen 200 on the screen 12*a* of the display device 12 by the display control unit 14*d* (S502). For example, when the next stop target is a turning position, the output information control unit 146 generates an instruction screen 200 that includes the temporary stop mark 204*a* as the instruction mark 204. When the vehicle 1 travels toward the next stop target by reverse movement, the output information control unit 146 generates the instruction screen 200 that includes the reverse indicator 205*a* as the indicator 205. The output information control unit 146 further generates the second display region 206 that displays character information giving an instruction of operation to the driver.

Next, the output information control unit 146 compares the distance between the stop target and the vehicle 1 with a plurality of thresholds (S503). For example, the guidance control unit 148 calculates the position of the vehicle 1 on the basis of the detection results of the distance measurement units 16 and 17 acquired by the data acquisition unit 141. In other words, the guidance control unit 148 acquires the position of the vehicle 1. Specifically, the guidance control unit 148 is an example of an acquisition unit. The guidance control unit 148 is not limited thereto, and may calculate the position of the vehicle 1 on the basis of the detection result of the wheel speed sensor 22. The guidance control unit 148 further calculates the distance between the vehicle 1 and the stop target on the basis of the position of the vehicle 1.

The output information control unit 146 acquires the distance between the stop target and the vehicle 1 from the guidance control unit 148. The output information control unit 146 further acquires a plurality of thresholds that are stored in the storage unit 149 in advance. The output information control unit 146 compares the distance between the stop target and the vehicle 1 with the thresholds.

If the output information control unit 146 determines that the distance between the stop target and the vehicle 1 falls below at least one threshold (Yes at S503), the output information control unit 146 renders the indicator 205 again (S504). For example, the output information control unit 146 increases or decreases the number of sections displayed brightly and the number of sections displayed darkly in the indicator 205 in accordance with the threshold below which the distance between the stop target and the vehicle 1 falls. After the output information control unit 146 renders the indicator 205 again, the output information control unit 146 returns to the comparison of the distance between the stop target and the vehicle 1 and a threshold (S503).

The output information control unit 146 stores the threshold below which the distance between the stop target and the vehicle 1 falls in the storage unit 149. If the distance between the stop target and the vehicle 1 falls below a new threshold (Yes at S503), the output information control unit 146 renders the indicator 205 again (S504). However, even if the distance between the stop target and the vehicle 1 falls below the threshold again below which the distance has fallen, the output information control unit 146 does not render the indicator 205 again (No at S503).

Figure 9:
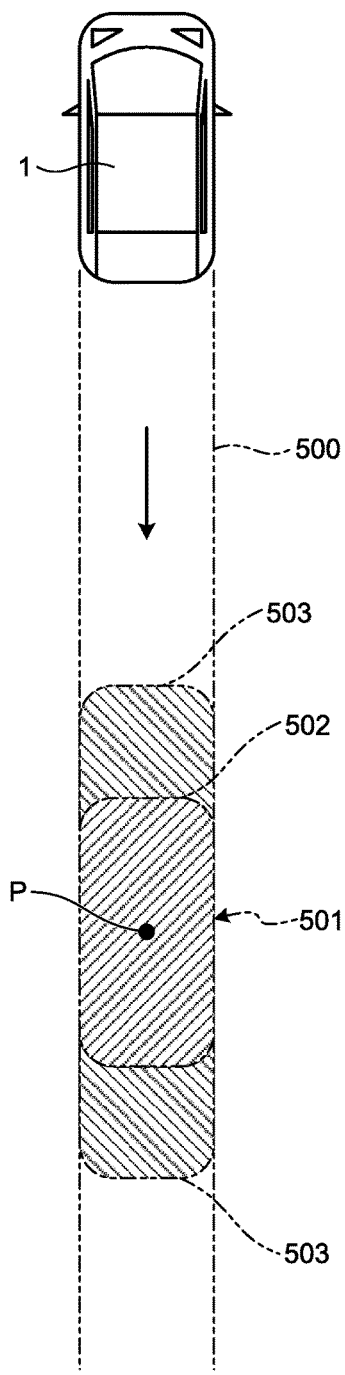
FIG. 9 is an exemplary diagram schematically illustrating a movement path of the vehicle created by a path calculation unit according to the embodiment.

If the output information control unit 146 determines that the distance between the stop target and the vehicle 1 does not fall below a new threshold (No at S503), the output information control unit 146 determines whether the vehicle 1 is located in a stop region (S505). FIG. 9 is a diagram schematically illustrating a movement path 500 of the vehicle 1 created by the path calculation unit 147. As illustrated in FIG. 9, the path calculation unit 147 sets a stop target P (parking completed position or turning position) and a stop region 501 including the stop target P in the movement path 500. Specifically, the path calculation unit 147 is an example of a target setting unit.

The stop region 501 is a region set around the stop target P. Specifically, the stop region 501 is set around the parking completed position and is also set around the turning position. The stop target P as the parking completed position is an example of a first target. The stop target P as the turning position is an example of a second target. The stop target P as the turning position is provided in the middle of a movement path for guiding the vehicle 1 to the stop target P as the parking completed position.

Each stop region 501 includes a stop target region 502 and a stop available region 503. The stop target region 502 can be referred to as "first region". The stop available region 503 can be referred to as "second region".

The stop target region 502 is a region where the vehicle 1 needs to be stopped in order to be parked along the originally calculated movement path 500. For example, the stop target region 502 is set in a predetermined range around the stop target P. The size of the stop target region 502 in the present embodiment is substantially the same as the size of the vehicle 1. The stop target region 502 is not limited thereto.

The stop available region 503 is set in a predetermined range around (ahead and behind) the stop target region 502. In other words, the stop available region 503 is a region outside the stop target region 502. In the case where the stop target P is a turning position, when the vehicle 1 is stopped in the stop available region 503, the path calculation unit 147 determines a new movement path 500 again. The new movement path 500 may be a movement path involving turning. As described above, the stop available region 503 is a position from which the vehicle 1 can be guided to the parking completed position along a movement path 500 different from the already set movement path 500. The stop available region 503 is not limited thereto.

The output information control unit 146 acquires the distance between the stop target P and the vehicle 1 from the guidance control unit 148, and determines whether the vehicle 1 is located in the stop region 501. If the output information control unit 146 determines that the vehicle 1 is not located in the stop region 501 (No at S505), the output information control unit 146 returns to the comparison of the distance between the stop target P and the vehicle 1 with a threshold (S503).

If the output information control unit 146 determines that the vehicle 1 is located in the stop region 501 (Yes at S505), the output information control unit 146 determines whether the vehicle 1 is located in the stop target region 502 (S506). The output information control unit 146 acquires the distance between the stop target P and the vehicle 1 from the guidance control unit 148, and determines whether the vehicle 1 is located in the stop target region 502.

Figure 10:
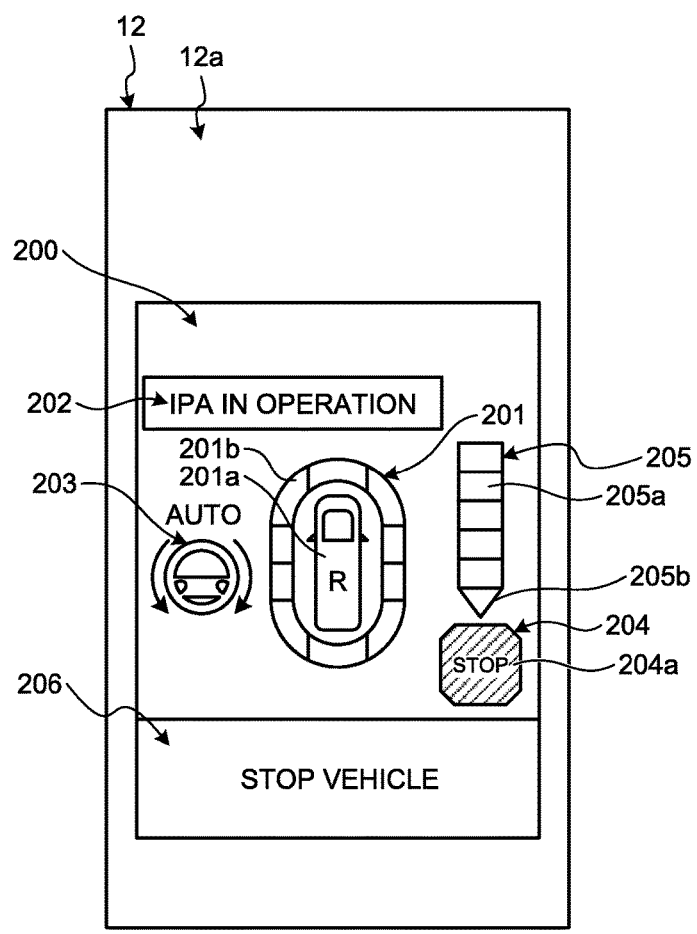
FIG. 10 is an exemplary diagram illustrating an example of the screen of the display device, which is displayed when the vehicle is located at a stop target, according to the embodiment.

FIG. 10 is a diagram illustrating an example of the screen 12*a* of the display device 12, which is displayed when the vehicle 1 is located in the stop region 501. If the output information control unit 146 determines that the vehicle 1 is located in the stop target region 502 (Yes at S506), the output information control unit 146 displays the instruction mark 204 on the screen 12*a* of the display device 12 brightly in red (with increased tone) (S507). The display form in which the instruction mark 204 is displayed brightly in red is an example of a first form. The first form is not limited thereto.

In contrast, if the output information control unit 146 determines that the vehicle 1 is not located in the stop target region 502 (No at S506), the output information control unit 146 displays the instruction mark 204 on the screen 12*a* of the display device 12 brightly in orange (S508). In other words, if the output information control unit 146 determines that the vehicle 1 is located in the stop available region 503, the output information control unit 146 displays the instruction mark 204 brightly in orange. The display form in which the instruction mark 204 is displayed brightly in orange is an example of the first form. For example, the output information control unit 146 may blink the instruction mark 204.

If the vehicle 1 is located outside the stop region 501 (No at S505), the output information control unit 146 displays the instruction mark 204 on the screen 12*a* of the display device 12 darkly (with reduced tone). The display form in which the instruction mark 204 is displayed darkly is an example of a second form. Specifically, the output information control unit 146 displays the instruction mark 204 even when the vehicle 1 is located outside the stop region 501.

As described above, the output information control unit 146 displays the instruction mark 204 brightly when the vehicle 1 is located within the stop region 501 including the stop target P, and displays the instruction mark 204 darkly when the vehicle 1 is located outside the stop region 501. The output information control unit 146 displays the instruction mark 204 such that the display form of the instruction mark 204 when the vehicle 1 is located in the stop target region 502 and the display form of the instruction mark 204 when the vehicle 1 is located in the stop available region 503 are different from each other.

Furthermore, the output information control unit 146 changes the character information in the second display region 206 when the vehicle enters the stop region 501. For example, the output information control unit 146 changes the character information in the second display region 206 to "STOP VEHICLE". The output information control unit 146 may control the voice control unit 14*e* such that the voice output device 9 outputs sound effects and voice.

Furthermore, the output information control unit 146 displays all sections in the indicator 205 darkly when the vehicle 1 is located within the stop region 501. The display form in which all sections are displayed darkly is an example of the second form. The output information control unit 146 displays at least one section in the indicator 205 brightly when the vehicle 1 is located outside the stop region 501. The display form in which at least one section is displayed brightly is an example of the first form.

If the output information control unit 146 displays the instruction mark 204 brightly in red or orange (S507, S508), the output information control unit 146 determines whether the vehicle 1 is stopped (S509). For example, the output information control unit 146 determines whether the vehicle 1 is stopped on the basis of the detection result of the wheel speed sensor 22 acquired by the data acquisition unit 141.

If the output information control unit 146 determines that the vehicle 1 is not stopped (No at S509), the output information control unit 146 returns to the determination whether the vehicle 1 is located in the stop target region 502 (S506). In contrast, if the output information control unit 146 determines that the vehicle 1 is stopped (Yes at S509), the output information control unit 146 changes the character information in the second display region 206 (S510). For example, when the vehicle 1 is stopped in the stop region 501 including the stop target P as a turning position, the output information control unit 146 displays character information that gives an instruction of operation for moving the vehicle 1 to the next movement path 500 in the second display region 206.

When the output information control unit 146 changes the character information in the second display region 206, the display of the instruction screen 200 generated by the output information control unit 146 is finished. For example, when the next stop target P is further present after the vehicle has arrived at the stop region 501, the output information control unit 146 generates and displays a new instruction screen 200 for guiding the vehicle 1 to the stop target P.

Figure 11:
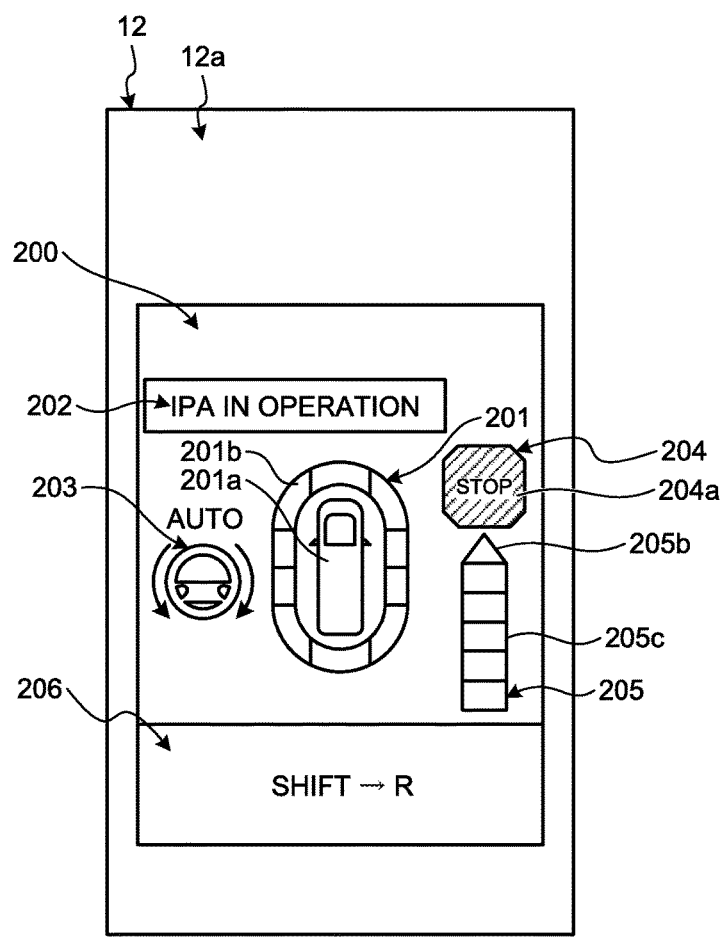
FIG. 11 is an exemplary diagram illustrating an example of the screen of the display device, which is displayed when the vehicle arrives at a stop target for a turning position by forward movement, according to the embodiment.

A plurality of other examples of the screen 12*a* of the display device 12 are described below. FIG. 11 is a diagram illustrating an example of the screen 12*a* of the display device 12, which is displayed when the vehicle 1 arrives at a stop target P as a turning position by forward movement. As illustrated in FIG. 11, when the vehicle 1 moves toward the stop target P as the turning position by forward movement, the output information control unit 146 displays a forward indicator 205*c* as the indicator 205. A distal end portion 205*b* of the forward indicator 205*c* is directed upward in the instruction screen 200.

The output information control unit 146 displays the temporary stop mark 204*a* because the vehicle 1 travels to the stop target P as the turning position. The output information control unit 146 displays the temporary stop mark 204*a* above the indicator 205.

When the vehicle 1 that has arrived at the stop region 501 including the stop target P as the turning position by forward movement is stopped, for example, the output information control unit 146 displays an instruction screen 200 as illustrated in FIG. 11 on the screen 12*a* of the display device 12. On the instruction screen 200 in FIG. 11, all sections in the indicator 205 are displayed darkly. The instruction mark 204 is displayed brightly in red or orange.

The vehicle 1 that has arrived at the stop region 501 including the stop target P as the turning position by forward movement and stopped is intended to travel to the next movement path 500 by reverse movement. Thus, the output information control unit 146 displays character information that instructs the driver to shift the movable portion in the gear shift operation unit 7 into the R-range in the second display region 206.

Figure 12:
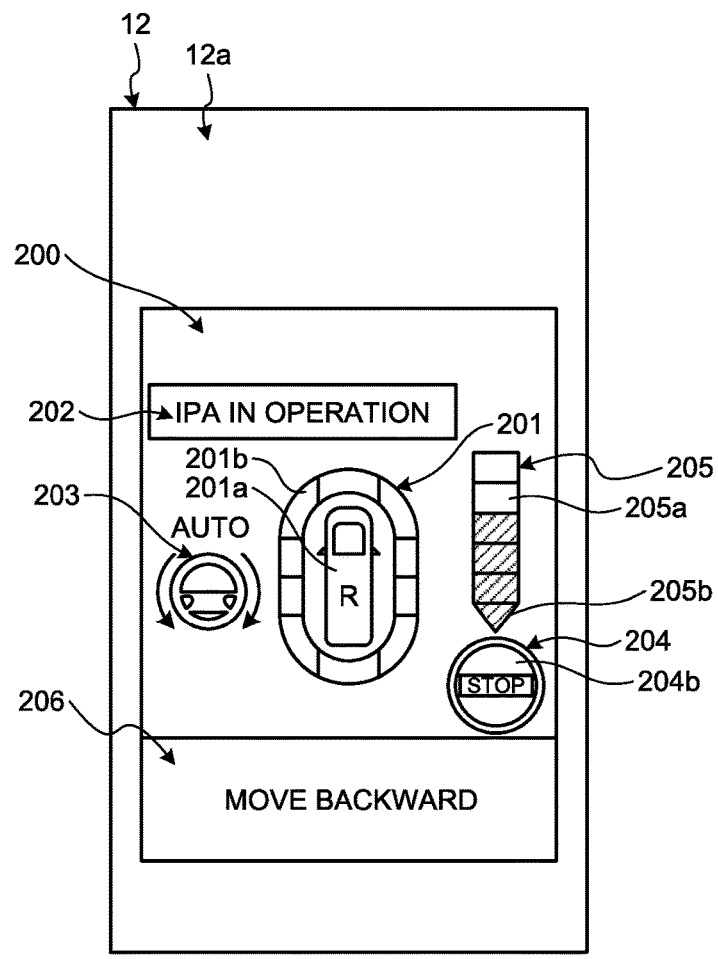
FIG. 12 is an exemplary diagram illustrating an example of the screen of the display device, which is displayed when the vehicle travels toward a stop target for a parking completed position, according to the embodiment.

FIG. 12 is a diagram illustrating an example of the screen 12*a* of the display device 12, which is displayed when the vehicle 1 travels toward a stop target P as a parking completed position. As illustrated in FIG. 12, when the vehicle 1 travels toward the stop target P as the parking completed position, the output information control unit 146 displays a stop mark 204b as the instruction mark 204. The stop mark 204b is an example of the first mark. The stop mark 204b has a shape different from that of the temporary stop mark 204a. The stop mark 204b may have the same shape as that of the temporary stop mark 204a as long as, for example, the stop mark 204b is different in color or size from the temporary stop mark 204a.

Figure 13:
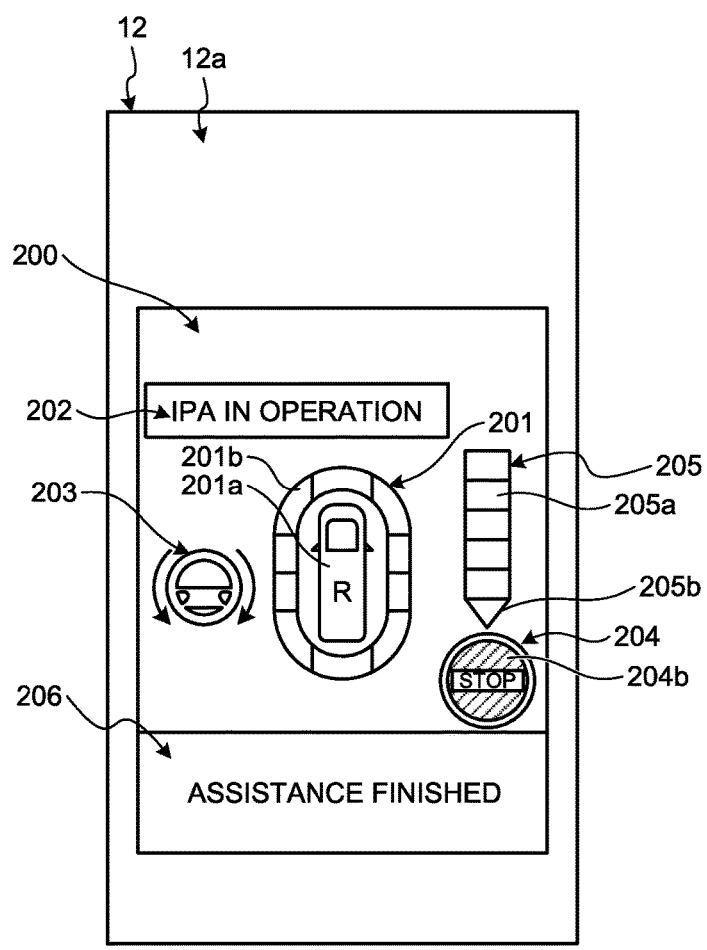
FIG. 13 is an exemplary diagram illustrating an example of the screen of the display device, which is displayed when the vehicle arrives at the stop target at the parking completed position, according to the embodiment.

FIG. 13 is a diagram illustrating an example of the screen 12a of the display device 12, which is displayed when the vehicle 1 arrives at the stop region 501 including the stop target P as the parking completed position. As illustrated in FIG. 13, the output information control unit 146 displays the instruction mark 204 brightly on the screen 12a of the display device 12 when the vehicle 1 enters the stop region 501 including the stop target P as the parking completed position.

When it is determined that the vehicle 1 has entered the stop region 501 including the stop target P as the parking completed position, the guidance control unit 148 finishes the control of the steering unit 4 via the steering system 13. The output information control unit 146 changes the character information in the second display region 206 to "ASSISTANCE FINISHED". Even after the control of the steering unit 4 by the guidance control unit 148 is finished, the output information control unit 146 displays the stop mark 204b on the screen 12a of the display device 12. The driver can refer to the display form of the stop mark 204b (red with increased tone, or orange with increased tone or reduced tone) to operate the braking operation unit 6, thereby stopping the vehicle 1 at a desired position.

In the above-mentioned embodiment, the output information control unit 146 controls the display device 12 to display the instruction mark 204 that instructs the driver to stop the vehicle. The output information control unit 146 further controls the display device 12 to display the instruction mark 204 in the display form in which the instruction mark 204 is displayed brightly when the vehicle 1 is located within the stop region 501 including the stop target P, and display the instruction mark 204 in the display form in which the instruction mark 204 is displayed darkly when the vehicle 1 is located outside the stop region 501. In this manner, the output information control unit 146 displays the instruction mark 204 even when the vehicle 1 is located outside the stop region 501, and changes the display form of the instruction mark 204 when the vehicle 1 arrives at the stop region 501. Consequently, the driver can know in advance by the instruction mark 204 that the vehicle 1 needs to be stopped, and can stop the vehicle 1 in the stop region 501 more smoothly. Furthermore, the driver can more clearly recognize that the vehicle 1 is located within the stop region 501.

The output information control unit 146 controls the display device 12 to display the indicator 205 that changes in accordance with the position of the vehicle 1. Consequently, the driver can recognize the distance to the stop target P by the indicator 205 to stop the vehicle 1 in the stop region 501 more smoothly.

The indicator 205 indicates the direction corresponding to the travel direction of the vehicle 1. The output information control unit 146 controls the display device 12 to dispose the instruction mark 204 in the direction indicated by the indicator 205 with respect to the indicator 205. Consequently, the driver can more intuitively recognize the distance to the stop target P by the indicator 205 to stop the vehicle 1 in the stop region 501 more smoothly.

The output information control unit 146 controls the display device 12 to display the stop mark 204b when the vehicle 1 travels toward the stop target P as the parking completed position and display the temporary stop mark 204a when the vehicle 1 travels toward the stop target P as the turning position. This configuration enables the driver to know in advance that the vehicle 1 needs to be moved to the stop target P as the parking completed position after the vehicle 1 is stopped in the stop region 501 including the stop target P as the turning position. Consequently, the driver can drive the vehicle more smoothly toward the stop target P as the parking completed position.

The output information control unit 146 controls the display device 12 such that the display form of the instruction mark 204 when the vehicle 1 is located in the stop target region 502 and the display form of the instruction mark 204 when the vehicle 1 is located in the stop available region 503 are different from each other. Consequently, the driver can recognize a more proper stop target region 502 to stop the vehicle 1 more smoothly.

The instruction screen 200 in the above-mentioned embodiment is merely an example. For example, the output information control unit 146 may move the instruction mark 204 in accordance with the distance between the vehicle 1 and the stop target P. In addition, the temporary stop mark 204a and the stop mark 204b may be displayed at different positions.

The display unit on which the instruction screen 200 is displayed is not limited to the display device 12. For example, the output information control unit 146 may display the instruction screen 200 on the display device 8 in the monitor device 11, or may display the instruction screen 200 on a windshield of the vehicle 1 by projection.

The above-mentioned embodiment of the present invention is not intended to limit the scope of the invention, but is merely an example included in the scope of the invention. An embodiment of the present invention may be subject to changes, omissions, and additions of, for example, at least part of specific purposes, structures, shapes, actions, and effects of the above-mentioned embodiment within the range not departing from the gist of the invention.

The invention claimed is:
1. A driving assistance device, comprising:
a processor that
sets a stop target,
acquires a position of a vehicle, and
controls a display unit to display a first image and a second image on a screen, the first image that instructs a driver to stop the vehicle, is displayed in a first form when the vehicle is located within a region including the stop target, and is displayed in a second form different from the first form when the vehicle is located outside the region, the second image indicating a direction corresponding to a travel direction of the vehicle, wherein
the processor controls the display unit to dispose the first image with respect to the second image in the direction indicated by the second image, and
the second image is an indicator that points to the first image.
2. The driving assistance device according to claim 1, wherein the second image changes in accordance with the position of the vehicle.
3. The driving assistance device according to claim 1, wherein
the stop target comprises a first target and a second target that is provided in a middle of a path for guiding the vehicle to the first target, the first image comprises a first mark and a second mark different from the first mark, and the processor controls the display unit to display the first mark when the vehicle travels toward the first target and display the second mark when the vehicle travels toward the second target.

4. The driving assistance device according to claim 2, wherein the processor controls the display unit to display the second image in the second form when the vehicle is located within the region and display the second image in the first form when the vehicle is located outside the region.

5. The driving assistance device according to claim 2, wherein the processor controls the display unit to display the first image or the second image brightly in the first form and display the first image or the second image darkly in the second form.

6. A driving assistance system, comprising:
a processor that
sets a stop target,
acquires a position of a vehicle, and
displays a first image and a second image on a screen, the first image that instructs a driver to stop the vehicle, is displayed in a first form when the vehicle is located within a region including the stop target, and is displayed in a second form different from the first form when the vehicle is located outside the region, the second image indicating a direction corresponding to a travel direction of the vehicle, wherein the processor disposes the first image with respect to the second image in the direction indicated by the second image, and the second image is an indicator that points to the first image.

7. The driving assistance device according to claim 1, wherein the second image includes a plurality of sections, and the processor increases or decreases a number of the sections in accordance with a distance between the vehicle and the stop target.

* * * * *